March 15, 1932.     H. ROSENTHAL     1,849,886
EXTRACTION OF OILS
Filed Sept. 13, 1928
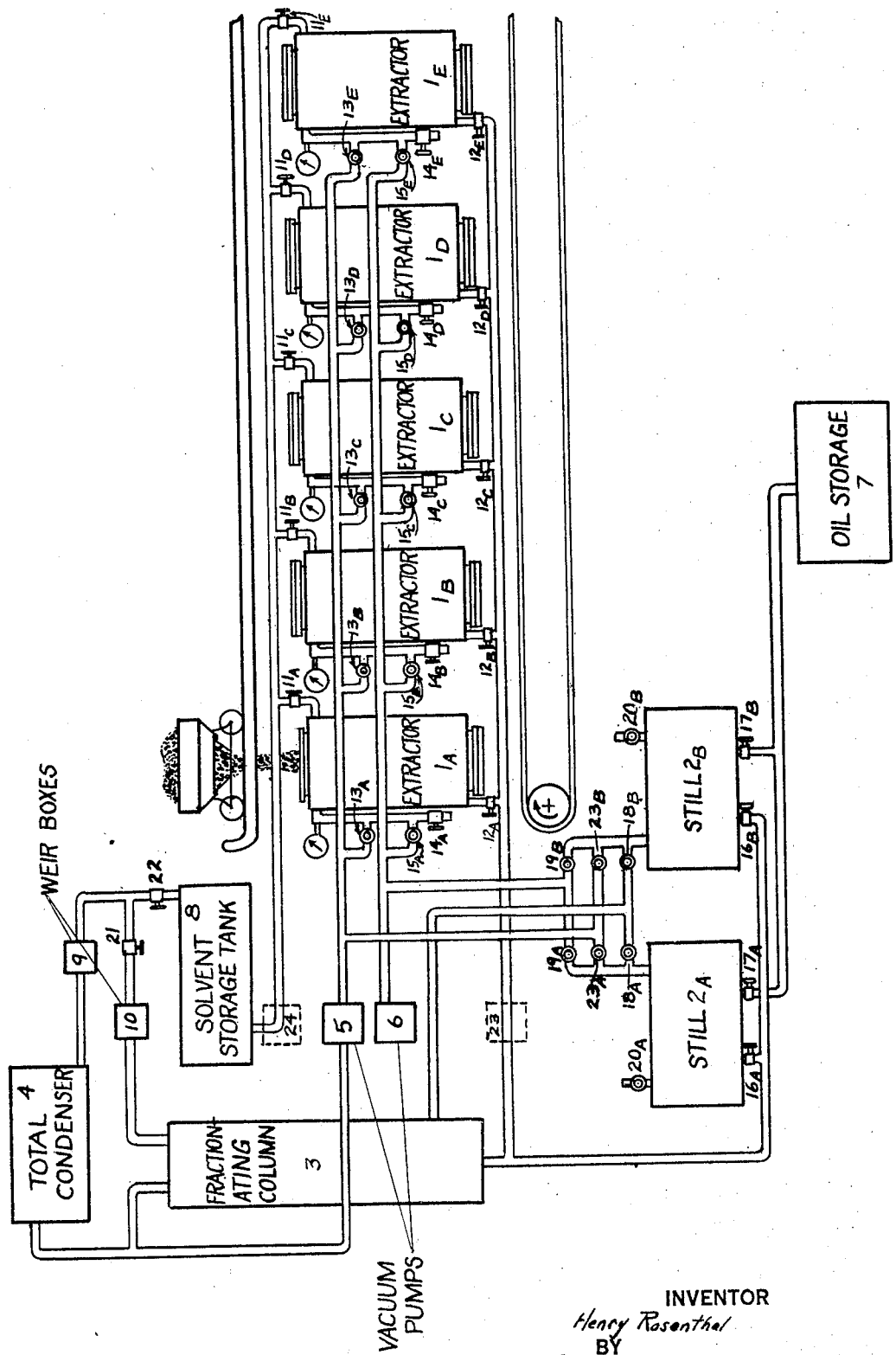
INVENTOR
Henry Rosenthal
BY
Pennie Davis Marvin & Edmonds
ATTORNEY Patented Mar. 15, 1932

1,849,886

UNITED STATES PATENT OFFICE

HENRY ROSENTHAL, OF NEW YORK, N. Y., ASSIGNOR TO COLUMBIA ENGINEERING & MANAGEMENT CORPORATION, OF NEW YORK, N. Y., A CORPORATION OF OHIO

EXTRACTION OF OILS

Application filed September 13, 1928. Serial No. 305,738.

This invention relates to the extraction of oleaginous materials with solvents and particularly to a method and apparatus to facilitate the use of solvents having relatively low boiling points.

The ordinary solvents used heretofore for extracting oleaginous materials are not well adapted for that purpose because of the difficulty encountered in removing traces of these solvents from the products. The products are thus degraded and are unfit either for human consumption or for use as cattle food, and attempts at solvent extraction have proved to be commercially impracticable in most cases.

In the application of Ebenezer Emmet Reid (Case C-1173), Patent #1,802,533, filed concurrently herewith, an extraction method is described in which the solvents are gaseous at ordinary atmospheric temperature and pressure. In that method the extraction is conducted preferably at pressures somewhat above the ordinary atmospheric pressure and the solvent is vaporized, condensed and returned to the material to be extracted at such pressures.

It is the object of the present invention to provide an improved method and apparatus wherein the operations described may be conducted effectively and economically.

The method and apparatus are especially adapted to prevent loss of solvent material, either in the extracted fat or oil, the material from which the fat or oil has been extracted, or in charging the extractors and removing the fat or oil from the system. The invention facilitates the recovery of a maximum quantity of fat or oil from the material charged to the extractors and ensures a finished product of high quality substantially free from solvent. The residue of the material treated, on being removed from the extractor, may be substantially free from oil and solvent.

My invention will be described in further detail by reference to the accompanying drawing which is a diagrammatic layout showing the apparatus covered by my invention.

Referring to the drawing, $1_A$, $1_B$, $1_C$, $1_D$ and $1_E$ are extractors; $2_A$ and $2_B$ are stills; 3 is a fractionating column; 4 is a condenser; 5 and 6 are vacuum pumps; 7 is an oil storage tank; 8 is a solvent storage tank; 9 and 10 are meters or weir boxes for measuring the flow of material controlling the fractionating column. Similar meters or weir boxes can be placed at other points in the system where control might be necessary. Thus, a meter or weir box may be used in connection with each extractor in order to control the flow of solvent material to the extractors. $11_A$, $11_B$, $11_C$, $11_D$ and $11_E$ are valves controlling the flow of solvent to the respective extractors. $12_A$, $12_B$, $12_C$, $12_D$, and $12_E$ are valves controlling the flow of solvent containing oil from the respective extractors. Valves $13_A$, $13_B$, $13_C$, $13_D$, and $13_E$ allow the respective extractors to be connected to vacuum pump 5 which is connected to discharge into condenser 4. Valves $14_A$, $14_B$, $14_C$, $14_D$ and $14_E$ allow air to be admitted to the extractors. Valves $15_A$, $15_B$, $15_C$, $15_D$ and $15_E$ permit the respective extractors to be connected to vacuum pump 6 which discharges to the air. Valves $16_A$ and $16_B$ connect the stills or kettles, $2_A$ and $2_B$ respectively, to the line by which the material is returned from the extractors, $1_A$, $1_B$, $1_C$, $1_D$, and $1_E$, and the reflux is returned from the bottom of the fractionating column 3. Valves $17_A$ and $17_B$ may be used to connect the stills to the oil storage tank 7. Valves $18_A$ and $18_B$ control the flow of vapors from the stills to the fractionating column 3. Valves $19_A$ and $19_B$ may be used for connecting the stills to vacuum pump 6; valves $23_A$ and $23_B$ may be used for connecting the stills to vacuum pump 5; and valves $20_A$ and $20_B$ may be used for admitting air to the stills. Valves 21 and 22 control the ratio of reflux of material to the fractionating column.

The operation of my apparatus may be described as follows:

Assume extractors $1_B$, $1_C$, $1_D$, and $1_E$ are being used, and that extractor $1_A$ is being filled. Under these conditions, all the valves controlling extractor $1_A$ will be closed, and valves $11_B$, $12_B$, $11_C$, $12_C$ etc. on the remaining extractors will be open, all other valves leading to the extractors being closed. Also assume that still $2_A$ is being used to furnish the bulk of the solvent for the extraction process, and that still $2_B$ has a charge containing solvent and extracted material from which the solvent is being removed. Valves $18_A$ and $18_B$ and valve $16_A$ will be open, the other valves leading to the stills being closed. Valves 21 and 22 controlling the flow from the condenser will be so opened that the proper reflux ratio will be maintained in the fractionating column.

When extractor $1_A$ has been filled and is ready to put back on the line after closing the heads or manholes, by which the material to be extracted is charged and removed from the extractors, valve $15_A$ is opened to vacuum pump 6 and the air is removed from the extractor. When sufficient vacuum has been built up as indicated by the gauge on the extractor, valve $15_A$ is closed and valve $11_A$ is opened, admitting the solvent to the extractor. Valve $12_A$ is then opened, permitting the flow of solvent containing extracted material back to the still.

If it is now desired to open up a second extractor, say $1_B$, from which the oil has been removed from the material to be extracted, valves $11_B$ and $12_B$ are closed and valve $13_B$ is opened. This operation closes the extractor $1_B$ to the solvent system except through the vacuum pump 5 which will produce a vacuum in the extractor $1_B$ and remove practically all of the solvent from the extracted material. In some cases it may be advisable to provide heating coils in the extractors to be used during this portion of the cycle to aid in eliminating the solvent from the residue from which the oil has been extracted. The vacuum pump 5, by discharging to the condenser 4, returns to the solvent system such solvent as was contained in the extractor when the valves $11_B$ and $12_B$ were closed. After sufficient vacuum has been obtained in the extractor, valve $13_B$ is closed and valve $14_B$ is opened. This admits air to the extractor, thereby breaking the vacuum and permitting the opening of the manhole covers, by which the extracted material is discharged and fresh material is admitted. When atmospheric pressure is reached in the extractor, valve $14_B$ is closed and the manholes opened and the material in the extractor discharged. The bottom manhole is then closed and fresh material charged to the extractor. The top manhole is then closed and valve $15_B$ is opened. This connects the extractor to the vacuum pump 6 and the air contained in the extractor chamber is removed. Valve $15_B$ is then closed and the extractor is ready to put back on the line by opening valves $12_B$ and $11_B$.

Heat is used to distill the bulk of the solvent from the extracted oil. This is done in the still, say $2_B$, by maintaining valve $18_B$ open and the other valves connecting the still closed. When the bulk of the solvent has been thus removed, valve $18_B$ is closed and valve $23_B$ is opened. This closes the still to the solvent system except through the vacuum pump 5 which removes the final traces of solvent from the extracted oil and discharges the solvent back to the solvent system through condenser 4. When the last traces of solvent have been removed in this manner, valve $23_B$ is closed and valve $20_B$ is opened, admitting air to the still and breaking the vacuum. Valve $17_B$ can then be opened and the extractor oil delivered to the oil storage system. Valves $17_B$ and $20_B$ are then closed and valve $19_B$ is opened, connecting the still to vacuum pump 6, thus removing the air from the still. When sufficient vacuum has been obtained, valve $19_B$ is closed and valves $16_B$ and $18_B$ are opened, thus placing the still $2_B$ on the solvent system. The solvent in still $2_A$ can then be removed from the solution of solvent and oil by closing valve $16_A$ and repeating the process just described in connection with still $2_B$.

It will be understood that the general procedure follows the method as described in the application aforesaid, that is, the extractor or extractors are supplied with solvent from the storage tank and the solution is delivered to one of the stills in which the solvent is evaporated. The vapor is delivered to the condenser preferably after passing through the fractionating column and the solvent then converted into the liquid phase is again delivered to the storage tank for further use in the extractor or extractors.

The solvent used may be gaseous at ordinary atmospheric temperature and pressure, for example, butane or isobutane, and a suitable pressure may be maintained in the system to ensure that the solvent is in the liquid phase when required. By "ordinary" atmospheric temperature and pressure I mean the temperature and pressure of the atmosphere as in commercial plants during all seasons of the year. The temperature in particular is subject to variation at different seasons. The pressure is subject to the usual barometric changes. The pressure maintained in the system may vary widely, for example between 0 and 100 pounds per square inch gauge or higher. At proper intervals the pressure is released and vacuum is applied as hereinbefore indicated to accomplish the objects described.

The system which I have described is one which is semi-continuous, that is, while batches of material are used both in the extractors and the stills, the operation is such that material may continuously be extracted in one or more extractors and material may be continually purified of the solvent in one of the stills. If only one still and one extractor were used, the same general mode of operation could be maintained with a straight batch process and the extraction could be conducted as described with minimum loss of solvent due to retention of solvent by the extracted material in the extracted oil and by evaporation and diffusion of the solvent in the process.

While I have shown in the drawing five extractors, two stills and one fractionating column and condenser, I do not limit my invention to these ratios and numbers as the number of extractors, stills, and fractionating columns required may be varied to suit local conditions.

Further changes in layout may be made without affecting the operation of the apparatus. Thus, vacuum pumps 5 and 6 may be combined in one pump by proper arrangement of valves and piping, and proper operation of the unit.

I have also described the operation of the system for a plant so laid out as to the levels of the various pieces of apparatus that the flow of the solvent through the system would be accomplished by the pressure developed by evaporation in the still and the action of gravity on the condensate from the condenser. It may be desirable in some cases not to allow sufficient height to provide the latter force. In this case a pump or pumps (23 and 24) can be used to circulate the liquid as shown dotted in the figure.

In some cases where condensing material is scarce or fuel is expensive, it may be advisable to reduce the amount of solvent circulated to a minimum. Under these conditions, it may be preferable to operate the extractors in series instead of in parallel as shown. In this case a pump will be required between each extractor and by proper valve and piping arrangement fresh solvent from the condenser may be led to the extractor from which most of the oil has been removed and finally passed out to the absorber having a fresh charge of material for extraction back to the still or kettle.

Other modifications may be made in the procedure and forms of apparatus without departing from my invention.

What I claim is:

1. The method of extracting oleaginous material which comprises applying a reduced pressure to the material then subjecting the material to a solvent which is gaseous at ordinary atmospheric temperature and pressure, maintaining the solvent in the liquid phase while in contact with the material to be extracted, withdrawing the solution, vaporizing the solvent to separate it from the extract by the application of heat at a temperature above that at which the extraction takes place and then the application of a partial vacuum condensing the solvent vapors and returning the condensate to the main extraction stage.

2. The method of extracting oleaginous material which comprises applying a reduced pressure to the material then subjecting the material to an organic solvent which is gaseous at ordinary atmospheric temperature and pressure, maintaining the solvent in the liquid phase while in contact with the material to be extracted, withdrawing the solution, vaporizing the solvent to separate it from the extact by the application of heat at a temperature above that at which the extraction takes place and then the application of a partial vacuum condensing the solvent vapors and returning the condensate to the main extraction stage.

3. The method of extracting oleaginous material which comprises applying a reduced pressure to the material then subjecting the material to a hydrocarbon solvent which is gaseous at ordinary atmospheric temperature and pressure, maintaining the solvent in the liquid phase while in contact with the material to be extracted, withdrawing the solution, vaporizing the solvent to separate it from the extract by the application of heat at a temperature above that at which the extraction takes place and then the application of a partial vacuum condensing the solvent vapors and returning the condensate to the main extraction stage.

4. The method of extracting oleaginous material which comprises applying a reduced pressure to the material then subjecting the material to a saturated hydrocarbon solvent which is gaseous at ordinary atmospheric temperature and pressure, maintaining the solvent in the liquid phase while in contact with the material to be extracted, withdrawing the solution, vaporizing the solvent to separate it from the extract by the application of heat at a temperature above that at which the extraction takes place and then the application of a partial vacuum condensing the solvent vapors and returning the condensate to the main extraction stage.

5. The method of extracting oleaginous material which comprises applying a reduced pressure to the material then subjecting the material to a solvent which is gaseous at ordinary atmospheric temperature and pressure under modified temperature and pressure conditions which maintain the solvent in the liquid phase while in contact with the material to be extracted, vaporizing the solvent to separate it from the extract by the application of heat at a temperature above that at which the extraction takes place and then the application of a partial vacuum condensing the solvent vapors and returning the condensate to the main extraction stage.

6. The method of extracting oleaginous material which comprises applying a reduced pressure to the material then subjecting the material to an organic solvent which is gaseous at ordinary atmospheric temperature and pressure, maintaining the solvent in the liquid phase while in contact with the material to be extracted, withdrawing the solution, vaporizing the solvent therefrom by the application of heat at a temperature above that at which the extraction takes place and then the application of a partial vacuum, condensing the solvent and returning it to the material to be extracted.

7. The method of extracting oleaginous material which comprises applying a reduced pressure to the material and then subjecting it to a hydrocarbon solvent which is gaseous at ordinary temperature and pressure, maintaining the solvent in the liquid phase while in contact with the material to be extracted, withdrawing the solution, introducing said solution into a still, fractionally distilling the solution by the application of heat at a temperature greater than that at which the extraction takes place, then applying a partial vacuum to remove the last traces of solvent, removing and condensing the solvent and returning it to the material to be extracted.

8. The method of extracting oleaginous material which comprises applying a reduced pressure to the material and then subjecting it to butane as a solvent which is gaseous at ordinary temperature and pressure, maintaining the solvent in the liquid phase while in contact with the material to be extracted, withdrawing the solution, introducing said solution into a still, fractionally distilling the solution by the application of heat at a temperature greater than that at which the extraction takes place, then applying a partial vacuum to remove the last traces of solvent, removing and condensing the solvent and returning it to the material to be extracted.

9. The method of extracting oleaginous material which comprises subjecting the material to a solvent which is gaseous at ordinary atmospheric temperature and pressure, maintaining the solvent in the liquid phase while in contact with the material to be extracted, withdrawing the solution and vaporizing the solvent to separate it from the extract by the application of heat at a temperature above that at which the extraction takes place.

In testimony whereof I affix my signature.

HENRY ROSENTHAL.

CERTIFICATE OF CORRECTION.

Patent No. 1,849,886.                                Granted March 15, 1932, to

HENRY ROSENTHAL.

It is hereby certified that error appears in the printed specification of the above numbered patent requiring correction as follows: Page 1, line 14, for the misspelled word "impractiable" read impracticable; page 2, line 77, for "extractor" read extracted; page 3, line 117, claim 5, before the word "vaporizing" insert the words and comma withdrawing the solution,; and that the said Letters Patent should be read with these corrections therein that the same may conform to the record of the case in the Patent Office.

Signed and sealed this 26th day of April, A. D. 1932.

(Seal)                                                          M. J. Moore,
Acting Commissioner of Patents.